(12) United States Patent
Hammad et al.

(10) Patent No.: US 9,973,141 B2
(45) Date of Patent: May 15, 2018

(54) SOLAR SYSTEM COMPRISING SELF SUSTAINABLE CONDENSATION, WATER COLLECTION, AND CLEANING SUBASSEMBLIES

(71) Applicant: Saudi Arabian Oil Company, Dhahran (SA)

(72) Inventors: Ahmad D. Hammad, Dhahran (SA); Stamatios Souentie, Dhahran (SA); Zaki Yusuf, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 101 days.

(21) Appl. No.: 14/597,404

(22) Filed: Jan. 15, 2015

(65) Prior Publication Data
US 2016/0211796 A1 Jul. 21, 2016

(51) Int. Cl.
*H02S 40/00* (2014.01)
*H02S 40/10* (2014.01)
(Continued)

(52) U.S. Cl.
CPC ............. *H02S 40/10* (2014.12); *B08B 3/00* (2013.01); *B08B 3/02* (2013.01); *B08B 3/024* (2013.01);
(Continued)

(58) Field of Classification Search
CPC .......... H02S 40/00; H02S 40/10; H02S 40/12; H02S 40/42; H02S 40/425; B08B 3/00;
(Continued)

(56) References Cited

U.S. PATENT DOCUMENTS 1,538,652 A * 5/1925 Poth .................. F04B 39/16
55/479
6,945,063 B2 9/2005 Max
(Continued)

FOREIGN PATENT DOCUMENTS

DE 102010047986 A1 4/2012
DE 102012013430 A1 5/2014
(Continued)

OTHER PUBLICATIONS

Sarver, "A comprehensive review of the impact of dust on the use of solar energy; History, investigations, results, literature, and mitigation approaches", Renewable and Sustainable Energy Reviews, vol. 22, pp. 698-733, 2013.
(Continued)

*Primary Examiner* — Lindsey Bernier
(74) *Attorney, Agent, or Firm* — Dinsmore & Shohl; Carolyn Alford

(57) ABSTRACT

A solar system is provided comprising a light receiving surface, a condensation subassembly, a water collection subassembly, and a cleaning subassembly. The expansion chamber of the condensation subassembly is thermally coupled to the light receiving surface and thermally insulated from the ambient such that expansion of compressed air in the expansion chamber, as controlled by the compressed air expansion valve, encourages humidity condensation on the light receiving surface by reducing the temperature of the light receiving surface. The water collection subassembly comprises a water collection vessel and water direction hardware positioned to direct condensed water on the light receiving surface to the water collection vessel. The cleaning subassembly comprises a water dispensing unit positioned to dispense water from the water collection vessel over the light receiving surface of the solar system.

23 Claims, 8 Drawing Sheets

(51) Int. Cl.
  *H02S 40/42* (2014.01)
  *B08B 5/00* (2006.01)
  *B08B 5/02* (2006.01)
  *B08B 7/00* (2006.01)
  *B08B 3/00* (2006.01)
  *B08B 3/02* (2006.01)
  *B08B 3/04* (2006.01)
  *H02S 50/00* (2014.01)
  *F24J 2/40* (2006.01)
  *F24J 2/46* (2006.01)
  *F24J 2/10* (2006.01)

(52) U.S. Cl.
  CPC ............... *B08B 3/04* (2013.01); *B08B 5/00* (2013.01); *B08B 5/02* (2013.01); *B08B 7/0092* (2013.01); *F24J 2/40* (2013.01); *F24J 2/461* (2013.01); *F24J 2/4612* (2013.01); *H02S 40/00* (2013.01); *H02S 40/42* (2014.12); *H02S 40/425* (2014.12); *H02S 50/00* (2013.01); *F24J 2/10* (2013.01); *F24J 2/4618* (2013.01); *F24J 2/4625* (2013.01); *Y02E 10/40* (2013.01); *Y02E 10/50* (2013.01); *Y02E 10/52* (2013.01)

(58) Field of Classification Search
  CPC .. B08B 3/02; B08B 3/024; B08B 3/04; B08B 5/00; B08B 5/02; B08B 7/0092; Y02E 10/50; Y02E 10/52; F24J 2/461
  USPC ........................... 136/244, 246, 252, 259
  See application file for complete search history.

(56) References Cited

U.S. PATENT DOCUMENTS

| | | | |
|---|---|---|---|
| 8,726,458 | B1 | 5/2014 | Mahr et al. |
| 2002/0046569 | A1* | 4/2002 | Faqih ............ B01D 5/009 62/188 |
| 2003/0150483 | A1 | 8/2003 | Max |
| 2004/0000165 | A1 | 1/2004 | Max |
| 2005/0271992 | A1* | 12/2005 | DeGrazia, Jr. ......... F23D 11/40 431/215 |
| 2007/0240278 | A1* | 10/2007 | MacDonald .............. B08B 5/02 15/405 |
| 2010/0043851 | A1* | 2/2010 | Levy ...................... B08B 3/02 134/56 R |
| 2010/0288334 | A1* | 11/2010 | Chu ....................... H02S 40/44 136/248 |
| 2012/0138123 | A1* | 6/2012 | Newdoll ................. F24J 2/461 136/246 |
| 2013/0291923 | A1 | 11/2013 | Kim |
| 2014/0060620 | A1 | 3/2014 | Placer |
| 2014/0194539 | A1 | 7/2014 | Hammad et al. |
| 2014/0354055 | A1 | 12/2014 | Black et al. |
| 2016/0204735 | A1* | 7/2016 | Tomlinson ............. H02S 40/10 136/244 |

FOREIGN PATENT DOCUMENTS

| | | |
|---|---|---|
| WO | 2011004411 A2 | 1/2011 |
| WO | 2014089566 A1 | 6/2014 |
| WO | 2014091172 A2 | 6/2014 |

OTHER PUBLICATIONS

International Search Report and Written Opinion dated Feb. 9, 2016 pertaining to International Application No. PCT/US2015/035750.
Wolfs, Frank, "17. Heat and the First Law of Thermodynamics." 17.4.1. Adiabatic Processes. University of Rochester. Jul. 6, 2016. http://teacher.pas.rochester.edu/phy121/lecturenotes/Chapter17/Chapter17.html.
Colwell, Catharine H., "Thermodynamic Processes." Four Gas Processes. PhysicsLAB. Jul. 6, 2016. http://dev.physicslab.org/document.aspx?doctype=3&filename=thermodynamics_gasprocesses.xml.

* cited by examiner cs # SOLAR SYSTEM COMPRISING SELF SUSTAINABLE CONDENSATION, WATER COLLECTION, AND CLEANING SUBASSEMBLIES

BACKGROUND

The present disclosure relates to photovoltaic, thermal, and other types of solar systems where a transmissive or reflective light receiving surface is exposed to the ambient and is subject to particulate contamination. More specifically, the present disclosure introduces technology for addressing particulate contamination of the light receiving surfaces utilized in such solar systems.

BRIEF SUMMARY

According to the subject matter of the present disclosure, a solar system is provided comprising condensation, water collection, and cleaning subassemblies that are configured to address the performance issues that arise from particulate deposition on particular light receiving surfaces of the solar system, as employed in urban, remote, or offshore locations. The subject matter of the present disclosure is suitable for construction of self-sustained solar systems that induce the condensation of humidity present in ambient air, capture and collect the condensed water, and clean particular light receiving surfaces of the solar system using the collected water.

In accordance with one embodiment of the present disclosure, expansion of compressed air is used to cool a light receiving surface of the solar system. Ambient humidity condenses on the light receiving surface, which also serves as the water collection media of the system. Captured water is collected in, for example, a vessel placed at the bottom edge of the surface, filtered for dust removal, and subsequently stored in a pressurized water tank. Compressed air is then used to elevate and pressurize the stored water and deliver it to a shower head pipe, or any other aqueous cleaning system. The shower head pipe is preferably placed at the top edge of the light receiving surface and equipped with water jet sprayers, nozzles, sprinklers, etc., which are aligned to affect efficient surface cleaning. It is contemplated that this cleaning hardware may be combined with one or more available water-utilizing automatic cleaning accessories, like brushes, wipers, mops, etc.

In accordance with another embodiment of the present disclosure, a solar system is provided comprising a light receiving surface, a condensation subassembly, a water collection subassembly, and a cleaning subassembly. The light receiving surface is exposed to ambient air. The condensation subassembly comprises a compressed air expansion valve coupled to an expansion chamber. The expansion chamber of the condensation subassembly is thermally coupled to the light receiving surface and thermally insulated from the ambient such that expansion of compressed air in the expansion chamber, as controlled by the compressed air expansion valve, encourages humidity condensation on the light receiving surface by reducing the temperature of the light receiving surface. The water collection subassembly comprises a water collection vessel and water direction hardware positioned to direct condensed water on the light receiving surface to the water collection vessel. The cleaning subassembly comprises a water dispensing unit fluidly coupled to the water collection vessel via a cleaning fluid duct. The water dispensing unit is positioned to dispense water from the water collection vessel over the light receiving surface of the solar system.

In yet another embodiment, a method of operating a solar system is contemplated where the solar system is operated by controlling activation conditions of the water collection subassembly as a function of ambient sensor output by controlling the release of compressed air from the compressed air supply through the compressed air expansion valve.

Although the concepts of the present disclosure are described herein with primary reference to some specific solar system configurations, it is contemplated that the concepts will enjoy applicability to any solar system including a light receiving surface that is exposed to the ambient and is subject to particulate contamination.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure introduces technology for addressing particulate contamination of the light receiving surfaces utilized in photovoltaic, thermal, and other types of solar systems where a transmissive or reflective light receiving surface is exposed to the ambient and is subject to particulate contamination. Such contamination, and the corresponding operational efficiency drop, are major challenges in today's solar systems, especially where particles and/or dirt concentration is high, as would be the case where the system is installed in remote, urban, or offshore locations.

Figure 1A:
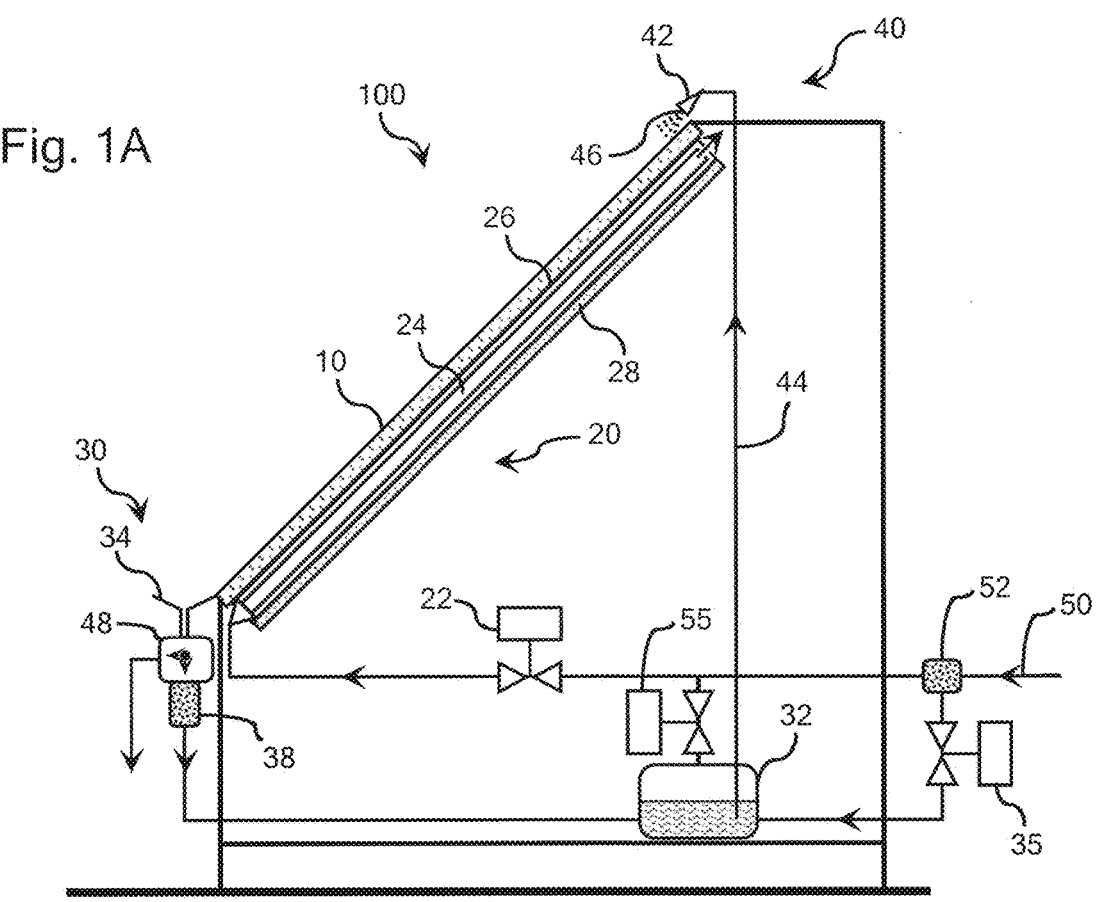
FIG. 1A illustrates a solar system according to one embodiment of the present disclosure with particular emphasis on the light receiving surface, condensation subassembly, water collection subassembly, and a cleaning subassembly thereof.

Referring initially to FIG. 1A, a solar system 100 is illustrated comprising a light receiving surface 10 exposed to ambient air, a condensation subassembly 20, a water collection subassembly 30, and a cleaning subassembly 40. The light receiving surface 10 may comprise an input face of a photovoltaic module or a reflective face of a solar reflector module configured to collect heat or other forms of concentrated solar energy.

The condensation subassembly 20 comprises a compressed air expansion valve 22 coupled to an expansion chamber 24. The expansion chamber 24 of the condensation subassembly 20 is thermally coupled to the light receiving surface 10 and is thermally insulated from the ambient. In operation, expansion of compressed air in the expansion chamber 24, as controlled by the compressed air expansion valve 22, cools the expansion chamber 24 and encourages humidity condensation on the light receiving surface 10 which is thermally coupled to the expansion chamber 24. For example, as is illustrated in FIG. 1A, the expansion chamber 24 of the condensation subassembly 20 can be thermally coupled to a backside of the module to ensure that the light receiving surface 10 cools with the expansion chamber 24.

Although not required, in the illustrated embodiment, the light receiving surface 10 comprises an input face of a photovoltaic or solar reflector module and one side of the expansion chamber 24 of the condensation subassembly 20 is thermally coupled to a backside of the module via a high thermal conductivity material 26, e.g., a conductive layer of copper or aluminum. It is also contemplated that the opposite side of the expansion chamber 24 of the condensation subassembly 20 may carry a layer of thermally insulating material 28 to minimize heat absorption directly from the environment and prevent condensation on the back side of the expansion chamber 24.

The water collection subassembly 30 comprises a water collection vessel 32 and water direction hardware 34 that is positioned to direct condensed water on the light receiving surface to the water collection vessel 32. In addition to water direction hardware 34, which is illustrated in FIG. 1A in the form of a peripheral water dam 36 positioned along at least a portion of the periphery of the light receiving surface 10, it is contemplated that the water collection subassembly 30 may comprise a water collection filter 38 that is positioned to remove particulates from condensed water before it is directed to the water collection vessel 32. It is also contemplated that the light receiving surface 10 may be provided with a transparent hydrophobic coating to improve condensate water repellency and resulting water collection.

The cleaning subassembly 40 comprises a water dispensing unit 42 that is fluidly coupled to the water collection vessel 32 via a cleaning fluid duct 44. The water dispensing unit 42 may terminate in one or more water spray nozzles 46 that are directed at the light collection surface 10 to dispense water from the water collection vessel 32 over the light receiving surface 10 of the solar system 100. Cleaning fluid may be driven up the cleaning fluid duct 44 by selectively pressurizing the water collection vessel via a compressed air supply 50 and a pressurization valve 55. For example, the water spray nozzles 46 may be configured in a linear array of nozzles secured to a shower head pipe, each operating at between about 35 kPa to about 350 kPa. During surface cleaning operation, compressed air may be directed exclusively to the water collection vessel 32 to ensure adequate pressurization of the water spray nozzles 46. The cleaning subassembly 40 can additionally be provided with a water diversion valve 48 that selectively diverts wastewater from, or directs filtered wastewater to, the water collection vessel 32 for selective recycling of water during cleaning operations.

Figure 2:
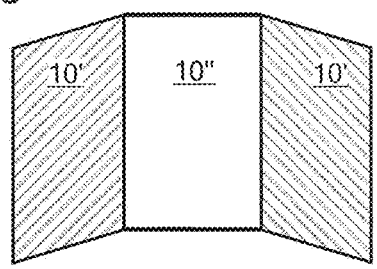
FIGS. 2 and 3 illustrates two of the many alternative types of light receiving surface configurations contemplated by the present disclosure.
Figure 3:
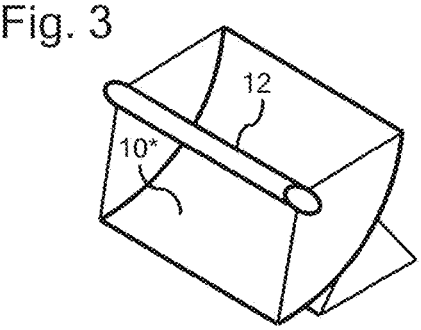

FIGS. 2 and 3 are presented to illustrate the fact that the present disclosure contemplates light receiving surfaces in a variety of forms, including substantially planar light receiving surfaces (see FIG. 2), curved light receiving surfaces 10* that are configured to define a focal point or a focal line of solar energy concentration at, e.g., a solar collector 12 (see FIG. 3), and complementary reflective and transmissive light receiving surfaces 10' that are configured to direct solar energy to the transmissive light receiving surface 10" (see FIG. 2).

Figure 1B:
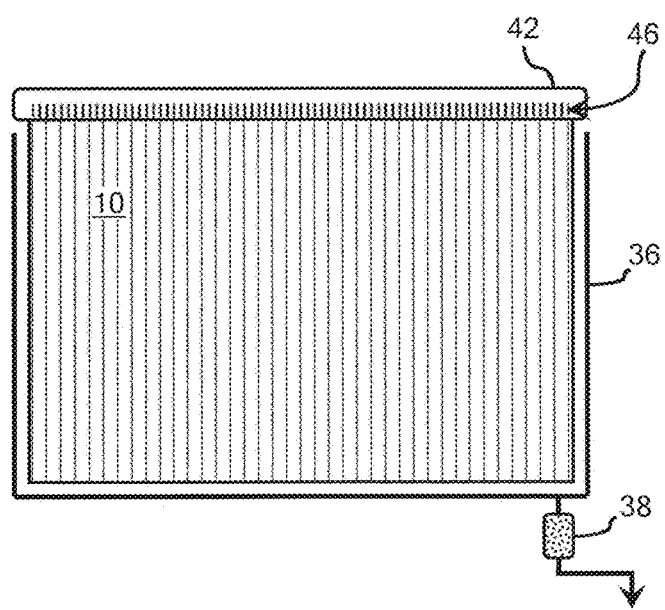
FIG. 1B illustrates a solar system according to one embodiment of the present disclosure with particular emphasis on the water dispensing unit and peripheral water dam thereof.
Figure 4:
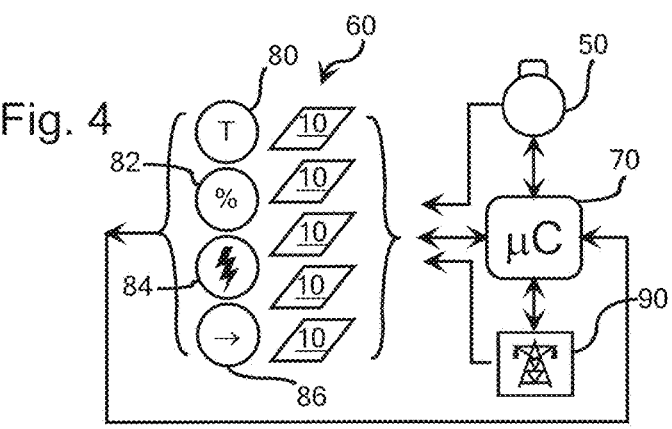
FIG. 4 illustrates a solar system configuration according to one embodiment of the present disclosure with particular emphasis on the ambient sensors of the system.

FIGS. 1 and 4 illustrate schematically the manner in which a compressed air supply 50 may be integrated with a solar system 100 according to the present disclosure. More specifically, the compressed air supply 50 may be directly or indirectly coupled to the compressed air expansion valve 22 of the condensation subassembly 20. Referring specifically to FIG. 4, where the solar system 100 comprises an array of solar units 60, each comprising a light receiving surface 10 and each associated with a condensation subassembly, a water collection subassembly, and a cleaning subassembly, it is contemplated that the compressed air supply 50 may comprise a central compressed air supply or a plurality of dedicated compressed air supplies in communication with individual solar units of the array of solar units 60. In either case, it is contemplated that, where the light receiving surface 10 comprises an input face of a photovoltaic module, the photovoltaic module can be configured to dedicate a portion of its photovoltaic output to the compressed air supply 50.

It is further contemplated that the compressed air supply may comprise a water trap 52 positioned to dehumidify compressed air in the compressed air supply 50. The water trap 52 may be placed in fluid communication with the water collection vessel 32 of the water collection subassembly 30 via a supplemental water collection valve 35. In this manner, the water trap 52, which may comprise cooling/condensing fins, and the supplemental water collection valve 35 can be used "on demand" to transfer captured condensate water to the water collection vessel 32. This dehumidification of the compressed air supply also prevents water entrainment on the interior surfaces of the condensation subassembly 20.

Referring to FIGS. 1 and 4, it is contemplated that the solar system 100 may be provided with a process controller 70 that is programmed to ensure activation of the water dispensing unit 42 of the cleaning subassembly 40 for cleaning the light receiving surface 10 prior to activation of the water collection subassembly 30, to help avoid the entrainment of particulate matter in the collected water. The process controller 70 can also be programmed to control activation of the water collection subassembly 30 as a function of ambient temperature, humidity, or a combination thereof, in response to signals from an ambient temperature sensor 80 and an ambient humidity sensor 82. Further, to avoid activation of the condensation subassembly 20 when there is insufficient air pressure in the compressed air supply 50, it is contemplated that the process controller 70 can be programmed to control activation of the cleaning subassembly 40 as a function of air pressure in the compressed air supply 50.

Where the light receiving surface comprises an input face of a photovoltaic module, it is further contemplated that the solar system 100 may be provided with photovoltaic module power monitor 84 and that the process controller 70 can be programmed to control activation of the cleaning subassembly as a function of power generated by the photovoltaic module, as sensed by the power monitor 84. For example, it is contemplated that, using the aforementioned components, an automated system could be configured to measure the ambient temperature, the humidity, or system performance degradation, and determine the frequency, duration, and time-of-day for activation of the collection and cleaning subassemblies.

It is also contemplated that the process controller 70 can be programmed to control the activation conditions of the water collection subassembly 30, e.g., release duration, pressure drop, or a combination thereof, as a function of ambient sensor output by controlling the release of compressed air from the compressed air supply 50. For example, in one embodiment, the ambient sensors comprise an ambient temperature sensor 80, an ambient humidity sensor 82, an ambient wind speed sensor 86, and appropriate operating conditions of the water collection subassembly can be set by the process controller 70 in accordance with temperature, humidity, wind speed, or various combinations of other measured climate conditions.

Referring further to FIG. 4, solar systems according to the present disclosure may comprise a supplemental power receptacle or other form of input that is configured to permit system operation under supplemental power from, e.g., an external power grid 90. For example, when the photovoltaic output of the photovoltaic module falls below a minimum operational threshold, as would occur at night or under other low light conditions, solar system operation may be supplemented by power by from the external power grid 90.

For energy conservation calculations, a mathematical model that includes environmental conditions, physical dimensions and mechanical factors of the system has been developed to cover seasonal variations. The model is based on thermodynamic principles and heat transfer laws in order to predict the energy requirements for condensation of humidity present in ambient air to capture a suitable water volume for the cleaning process. The model is presented herein for illustrative purposes only and should not be used to limit the scope of the appended claims beyond their literal recitations.

The model uses the maximum temperature for humidity condensation at ambient pressure on top of a specific surface area of a PV module, and is equally applicable to reflectors for solar thermal systems. The area above the light receiving surface and the relative humidity will determine the duration of operation to collect a suitable water condensate and make it available for cleaning at minimum energy consumption. Additionally, it should be pointed out that in case of high humidity in ambient air, a significant amount of water is also collected by cooling the compressed air via finned heat transfer, before expansion at the PV module.

The model, as presented below, is based on "PV-station features", "PV-assembly features", "environmental parameters" and "washing system details." Specifically, the "PV-station features" include power output, PV area, and chilled area. The "PV-assembly features" include, assuming silicon monocrystalline or polycrystalline solar modules, hollow PV design, glass thickness, glass thermal conductivity, EVA thickness, EVA thermal conductivity, silicon thickness, silicon thermal conductivity, Tedlar thickness, Tedlar thermal conductivity, aluminum frame thickness, and aluminum frame thermal conductivity. The "environmental parameters" include ambient temperature, ambient pressure, relative humidity, sunny days per year, daytime per day, and wind speed. The "washing system details" include elevation for water lift, piping dimensions, nozzle head pressure, suitable water volume for cleaning, water storage tank volume, duration of cleaning, and cleaning frequency.

A number of governing equations are utilized to develop the model, and are presented below.

Temperature of the Chilled PV Surface.

To determine a suitable temperature of the chilled PV surface (exterior—in contact with air), consider that, in order for moisture to condensate on a chilled surface and water to be formed, the relative humidity (RH) needs to reach 100%. This temperature is called "dew point". Antoine's equation for water saturation in air is as follows (A=8.074, B=1730.63, C=233.4):

$$\log P = A - \frac{B}{C+T}$$

Temperature of Chilled Air (after Expansion).

For the calculation of a suitable temperature of cooling air for surface chilling (interior—after expansion), the heat transfer rate from ambient air on the surface and the temperature of interior assembly of the PV module may be calculated, as follows:

$$\dot{Q} = h_c A \Delta T$$

(heat transfer rate with convection)

$$\dot{Q} = \lambda \frac{\Delta T}{\Delta L}$$

(heat transfer rate with conduction through the system's materials)

where $\lambda$ is the thermal conductivity of each material of the assembly and $\Delta L$ each material's thickness (perpendicular to the heat transfer vector/direction). Since the thickness of interior surfaces of the assembly is very small, the linear temperature gradient approach can be used with minimal error.

Chilled Air Supply Rate.

To determine a suitable chilled air supply rate, consider that, at steady state, the heat removal rate from the interior assembly to the chilled air is proportional to the mass flux of cooling air ($\dot{m}_{air}$ in g/s), the specific heat capacity of cooled air, and the temperature difference:

$$\dot{Q} = \dot{m}_{air} C_{p,air} \Delta T$$

Water Condensation Rate.

The condensation rate of water on the chilled surface can be calculated using the water liquification (condensation) enthalpy ($H_2O(g) \rightarrow H_2O(l) + \Delta H$, exothermic), which equals 540 cal/g at 25° C. [2]. Thus, the condensation rate will be:

$$\dot{m}_{H_2O} = \frac{\dot{Q}}{\Delta H}$$

Chilled Air by Adiabatic Expansion.

Assuming ideal gas behavior of air that is undergoing a reversible adiabatic expansion, it implies that $PV^\gamma$ is constant during the expansion, where P is the pressure, V the volume and $\gamma$ the heat capacity ratio of air ($C_p/C_v$). From the above, one can conclude that:

$$T_2 = T_1 \left(\frac{P_2}{P_1}\right)^{\frac{\gamma-1}{\gamma}}$$

where $P_1$ (compressed air pressure) can be calculated for $T_1$ (ambient temperature), $P_2$ (ambient pressure) and $T_2$ (chilled air temperature).

Pressure Requirement for the Cleaning System.

Suitable total pressure for cleaning is the summation of the pressure applied at the water nozzle (or sprayer or sprinkler) plus the hydrostatic pressure requirement for lifting cleaning water to the shower head. The developed mathematical model in this invention disclosure has been tested for 10 psig which falls between the commercial pressure requirements.

To calculate the energy needed to compress air at this pressure, an adiabatic process is assumed, thus:

$$W = anRT_1\left(\left(\frac{P_2}{P_1}\right)^{\frac{\gamma-1}{\gamma}} - 1\right)$$

where α equals $1/(\gamma-1)$, n the number of moles of air to compress. A suitable air mole per cleaning cycle is equal to the moles of air used at the water pressure tank plus the moles of air used at the expansion valve. At the water tank, the moles of air (under pressure) equal (PV)/(RT). At the expansion valve, the moles of air needed have already been calculated above, as the rate of chilled air supply. Using the amount of energy for compression per mole of air and the air supply molar rate, the energy consumption rate for compression can be calculated.

Figure 5:
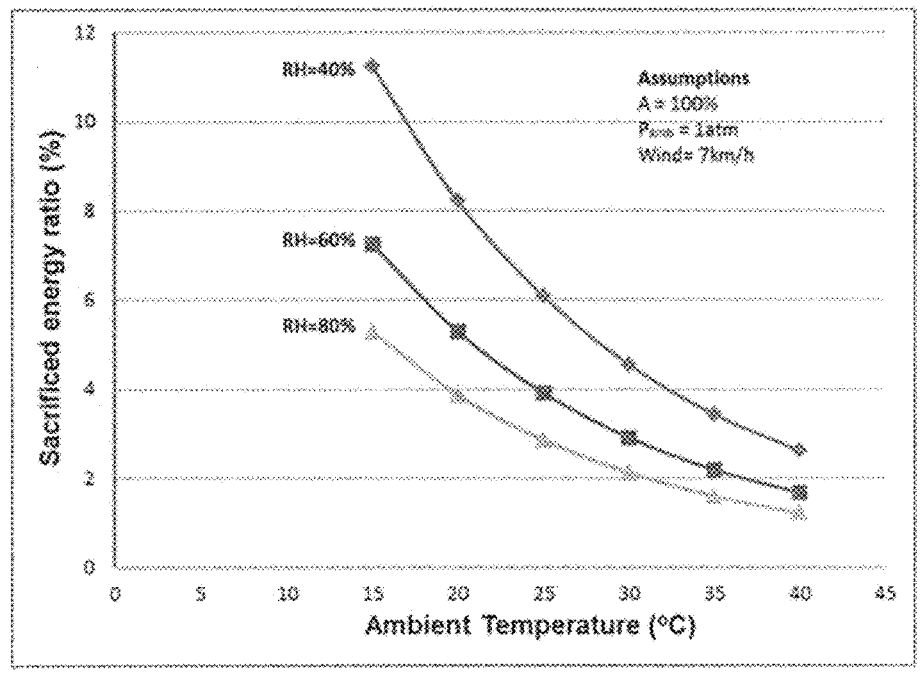
FIGS. 5-15 illustrate modeled operational data supporting the efficacy of solar systems according to the present disclosure.

The effect of ambient temperature, relative humidity, percentage of chilled surface area, compressor efficiency, suitable cleaning water volume, wind speed and shower head pressure on the energy consumption of the solar system technology proposed herein, expressed as sacrificed energy ratio, as determined using the aforementioned mathematical mode, is illustrated in FIGS. 5-11. The following data have been used in the mathematical model:

PV system installation parameters:
1. PV system surface: 1 m²
2. PV system power output: 180 W [3]
3. Glass thickness: 3 mm
4. EVA thickness: 0.3 mm
5. Silicon thickness: 0.2 mm
6. Tedlar thickness: 2 mm
7. Installation maximum height: 1.8 m Environmental details:
1. Ambient pressure: 1 atm
2. Sunny days per year: 310
3. Average daytime per day: 10 h Cleaning system details:
1. Separate compressors for the chilling and the washing system
2. Suitable water for cleaning: 120 ml
3. Shower head pipe diameter: 0.5"
4. Energy losses at piping: 2%
5. Nozzle dead pressure: 10 psig
6. Cleaning duration: 30 s
7. Cleaning frequency: twice per week FIG. 5 illustrates the effect of ambient temperature on the sacrificed energy ratio for the solar PV system. Ambient temperature ranges from 15° C. to 40° C., while relative humidity is fixed in each case. Furthermore, chilled area percentage (A), ambient pressure (P), wind speed and water volume are 1 atm, 100%, 7 km/h and 120 ml respectively.

Figure 6:
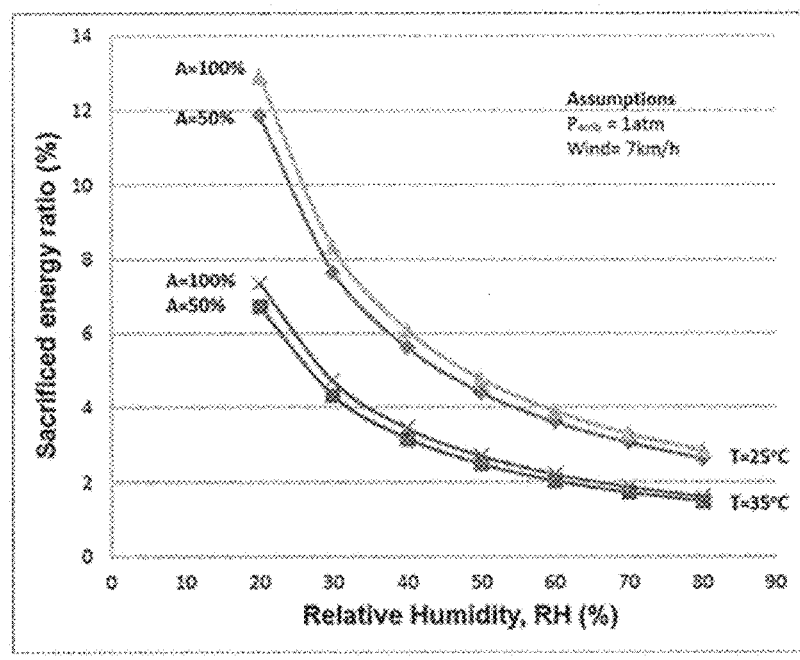

FIG. 6 illustrates the effect of relative humidity (RH) on the sacrificed energy ratio of the solar PV system. Relative humidity ranges from 20% to 80%, while chilled PV surface percentage (A) and ambient temperature (T) are fixed in each case. Furthermore, ambient pressure (P), wind speed and water volume are 1 atm, 7 km/h and 120 ml respectively.

Figure 7:
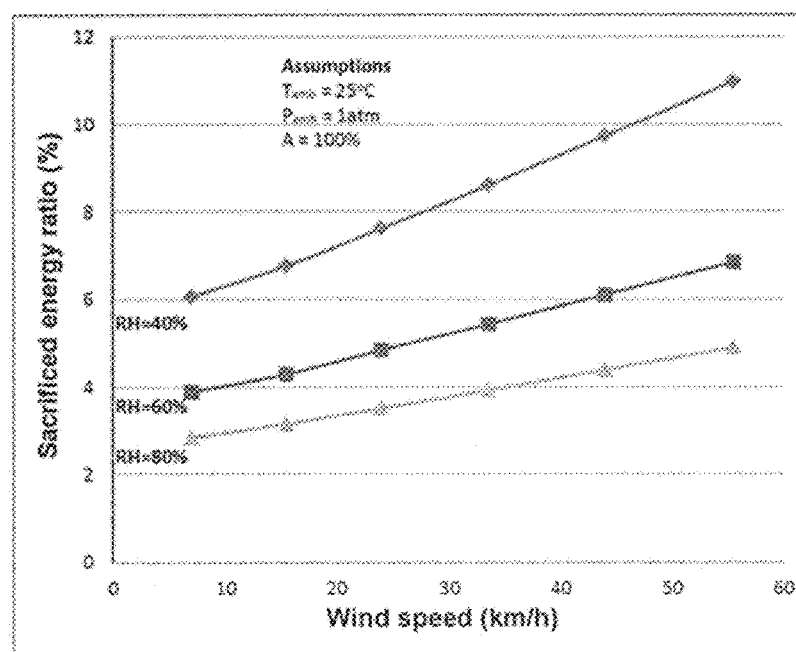

FIG. 7 illustrates the effect of wind speed on the sacrificed energy ratio for the solar PV system. Wind speed ranges from 7 to 57 km/h, while relative humidity is fixed in each case. Furthermore, ambient temperature (T), chilled area percentage (A), ambient pressure (P), and water volume are 25° C., 100%, 1 atm and 120 ml respectively.

Figure 8:
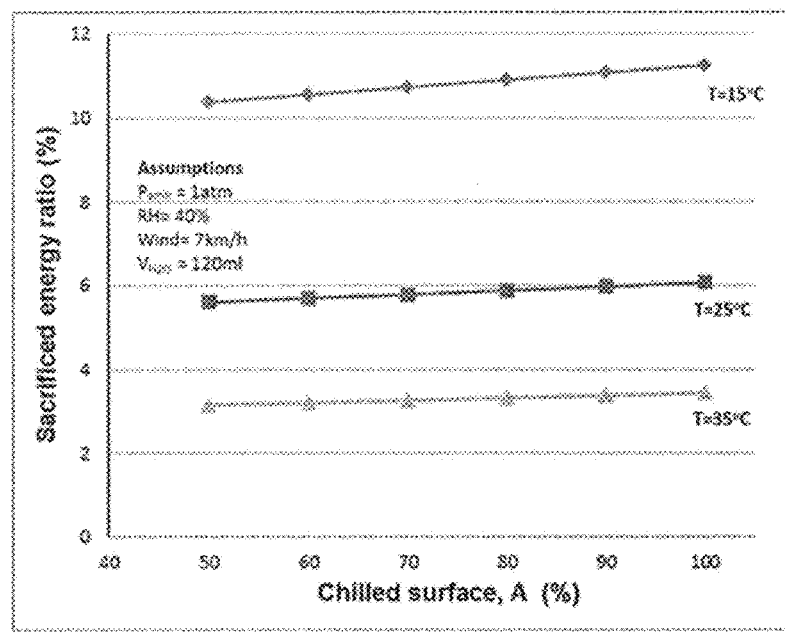

FIG. 8 illustrates the effect of chilled area percentage on the sacrificed energy ratio of the solar PV system. Chilled area percentage ranges from 50% to 100%, while ambient temperature (T) is fixed in each case. Furthermore, ambient pressure (P), relative humidity (RH), wind speed and water volume are 1 atm, 40%, 7 km/h and 120 ml respectively.

Figure 9:
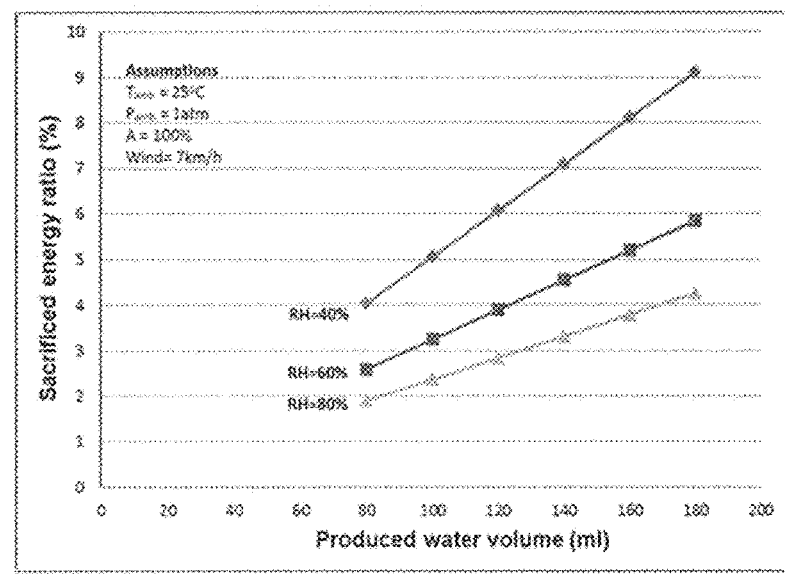

FIG. 9 illustrates the effect of produced water volume on the sacrificed energy ratio for the solar PV system. Produced water volume ranges from 80 to 180 ml, while relative humidity is fixed in each case. Furthermore, ambient temperature (T), chilled area percentage (A), ambient pressure (P), and wind speed are 25° C., 100%, 1 atm and 7 km/h respectively.

Figure 10:
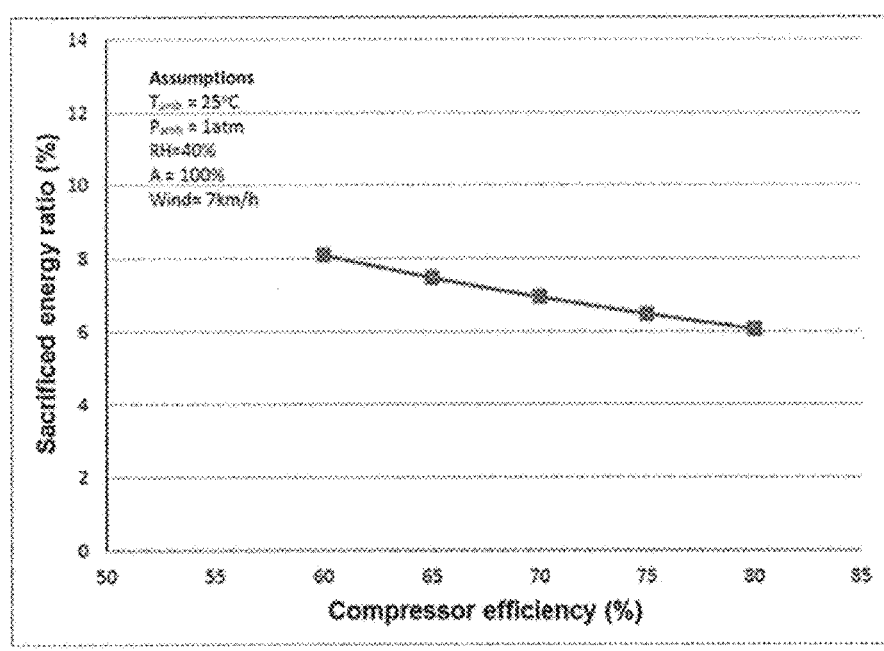

FIG. 10 illustrates the effect of the compressor efficiency on the sacrificed energy ratio for the solar PV system. Ambient temperature (T), chilled area percentage (A), ambient pressure (P), produced water volume and wind speed are 25° C., 100%, 1 atm, 120 ml and 7 km/h respectively.

Figure 11:
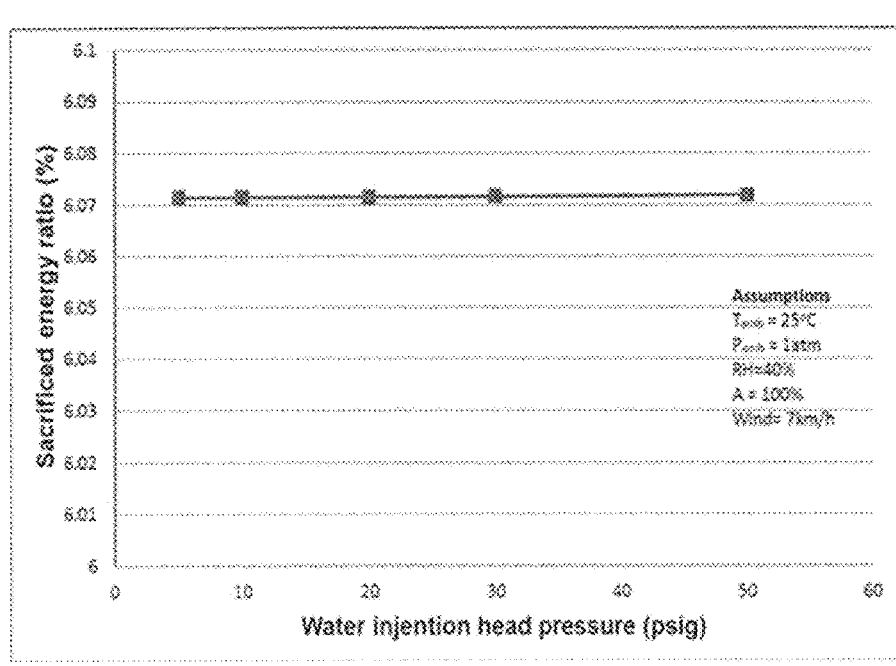

FIG. 11 illustrates the effect of the water injection head pressure on the sacrificed energy ratio for the solar PV system. Ambient temperature (T), chilled area percentage (A), ambient pressure (P), relative humidity (RH), produced water volume and wind speed are 25° C., 100%, 1 atm, 40%, 120 ml and 7 km/h respectively.

In the above discussed model, as illustrated in FIGS. 5-11, it is helpful to adjust the operating parameters of the cleaning system (P and cooling air flowrate) according to the ambient environmental conditions, i.e. ambient temperature, relative humidity and wind speed. In order to minimize sacrificed energy, two low energy consumption operations have been determined: i) the operation under fixed pressure at the compressor used for cooling air supply-expansion, and ii) the operation under fixed chilled PV surface temperature (exterior—in contact with air).

Operation Under Fixed Pressure at the Compressor for Cooling Air Supply.

Figure 12A:
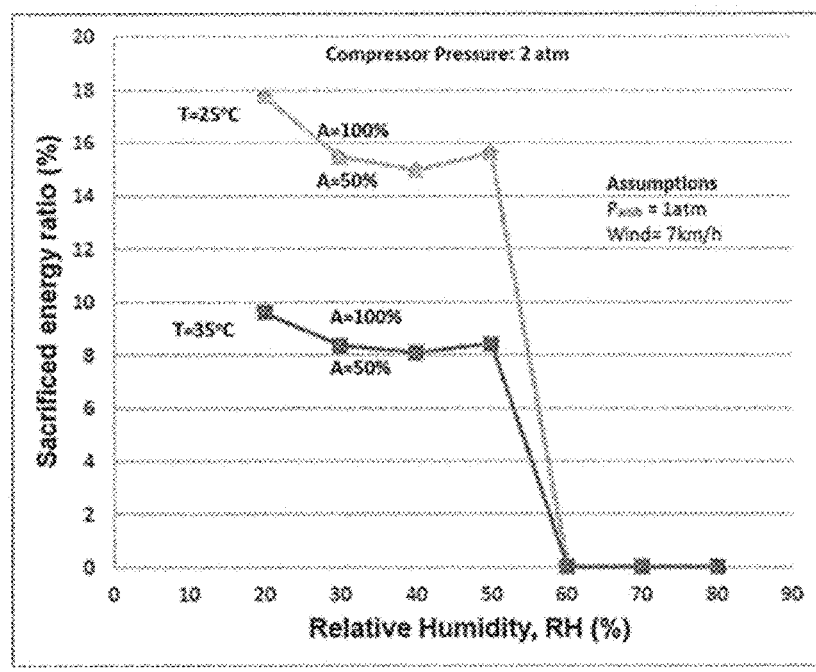
Figure 12B:
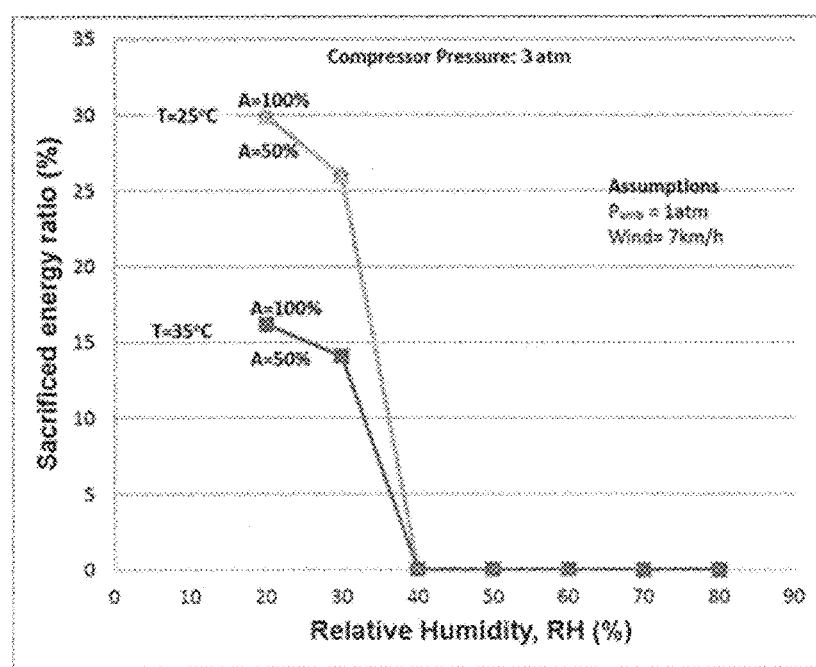

FIG. 12a illustrates the effect of the ambient air relative humidity on the sacrificed energy ratio for the solar PV system, under fixed operating pressure at the compressor for cooling air supply at 2 atm. Relative humidity ranges from 20% to 80%, while chilled PV surface percentage (A) and ambient temperature (T) are fixed in each case. Furthermore, ambient pressure (P), wind speed and water volume are 1 atm, 7 km/h and 120 ml respectively. FIG. 12b. illustrates the effect of the ambient air relative humidity on the sacrificed energy ratio for the solar PV system, under fixed operating pressure at the compressor for cooling air supply at 3 atm. Relative humidity ranges from 20% to 80%, while chilled PV surface percentage (A) and ambient temperature (T) are fixed in each case. Furthermore, ambient pressure (P), wind speed and water volume are 1 atm, 7 km/h and 120 ml respectively.

Collectively, FIGS. 12a and 12b show the effect of relative humidity on the sacrificed energy ratio for the solar PV system, in the case where the operating pressure at the compressor for cooling air supply is fixed at 2 atm and 3 atm, respectively. As is shown in FIGS. 12a and 12b, a sharp drop in the sacrificed energy ratio (energy consumption of the cleaning system) is observed at RH ~50% and ~35%, when the pressure is fixed at 2 atm and 3 atm respectively. This sharp drop in energy consumption is attributed to the significant amount of condensate water that is captured by compression, fin-cooling and subsequent dehumidification of humid air at the second tank.

Figure 13:
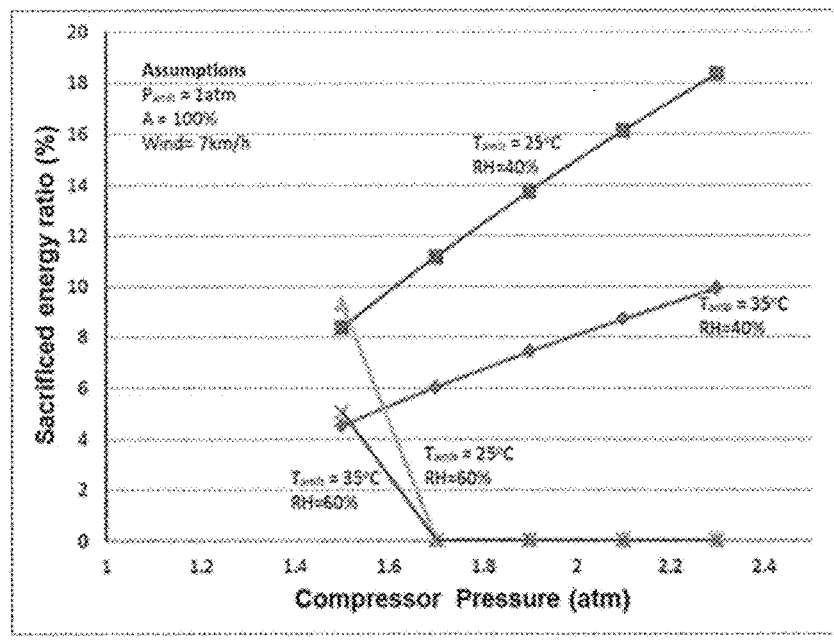

A sensitivity analysis of the sacrificed energy ratio of the solar PV system on the operating pressure of the compressor (for cooling air supply) is shown in FIG. 13, under fixed compressor operating pressure conditions. FIG. 13 illustrates the sensitivity analysis of the operation pressure of the compressor for cooling air supply on the sacrificed energy ratio for the solar PV system under fixed operating pressure conditions. The cases of 40 and 60% relative humidity at 25 and 35° C. ambient temperature are shown. Ambient pressure (P), wind speed and water volume are 1 atm, 7 km/h and 120 ml respectively. Compressor operating pressure ranges between 1.5 and 2.3 atm, while the cases of 40 and 60% relative humidity at 25 and 35° C. ($T_{amb}$) are presented. As illustrated in FIG. 13, the effect of the compressor operating pressure on the energy consumption of the described in this invention cleaning system is significant under low $T_{amb}$ and RH levels where water is only captured by ambient air dehumidification on the exterior of the chilled PV-surface.

Operation Under Fixed Chilled PV Surface Temperature.

Figure 14A:
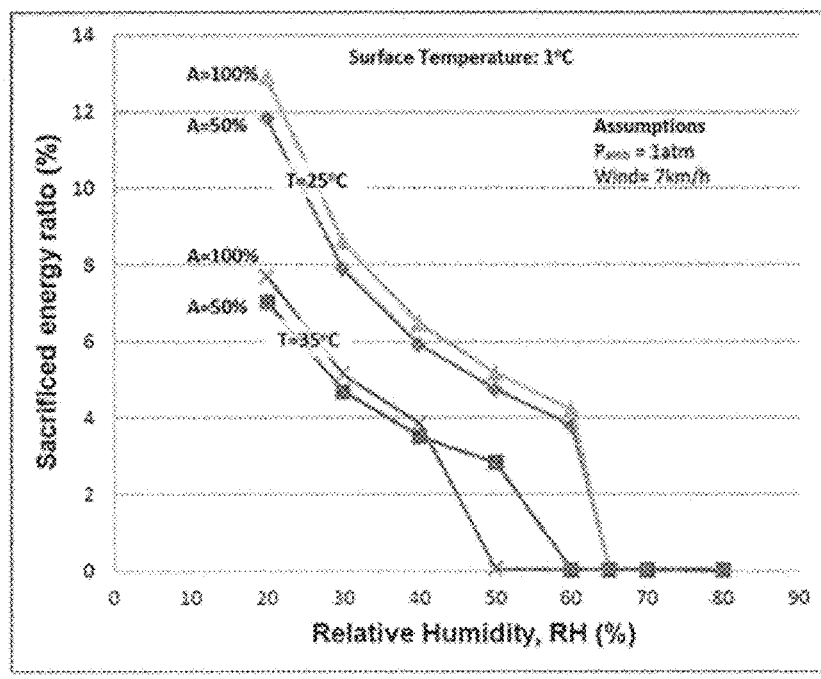
Figure 14B:
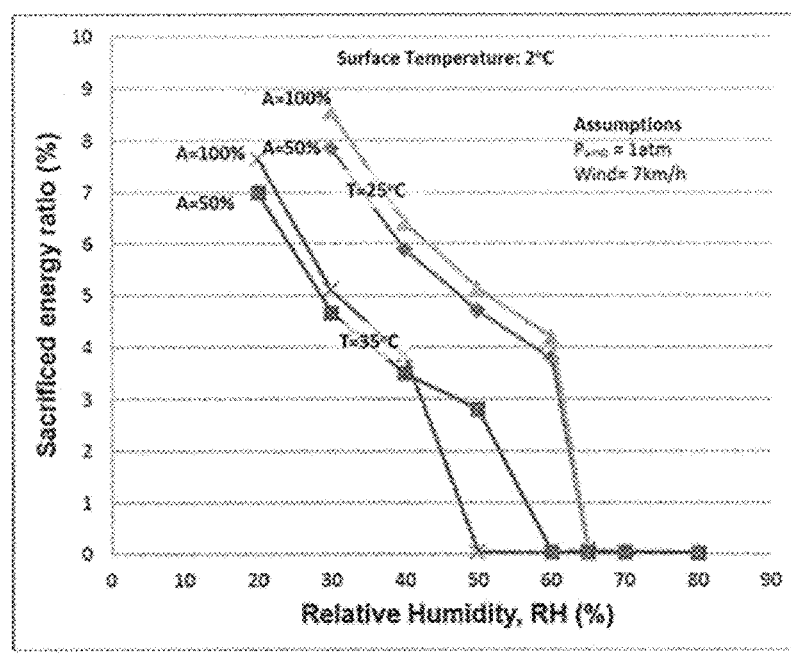

FIG. 14a illustrates the effect of the ambient air relative humidity on the sacrificed energy ratio for the solar PV system, under fixed chilled PV surface temperature 1° C. Relative humidity ranges from 20% to 80%, while chilled PV surface percentage (A) and ambient temperature (T) are fixed in each case. Furthermore, ambient pressure (P), wind speed and water volume are 1 atm, 7 km/h and 120 ml respectively. FIG. 14b illustrates the effect of the ambient air relative humidity on the sacrificed energy ratio for the solar PV system, under fixed chilled PV surface temperature 2° C. Relative humidity ranges from 20% to 80%, while chilled PV surface percentage (A) and ambient temperature (T) are fixed in each case. Furthermore, ambient pressure (P), wind speed and water volume are 1 atm, 7 km/h and 120 ml respectively.

Collectively, FIGS. 14a and 14b show the effect of relative humidity on the sacrificed energy ratio for the solar PV system, in the case where the chilled exterior PV surface temperature, where air humidity condensation occurs, is fixed at 1° C. and 2° C., respectively. As shown in the FIGS. 14a and 14b), a sharp drop in the sacrificed energy ratio, similar to the one observed in FIGS. 12a & 12b, is observed when RH is in the range 40-60%. This sharp drop is attributed to the significant amount of condensate water that can be collected after compression, fin-cooling and subsequent dehumidification of humid air at the second tank.

Figure 15:
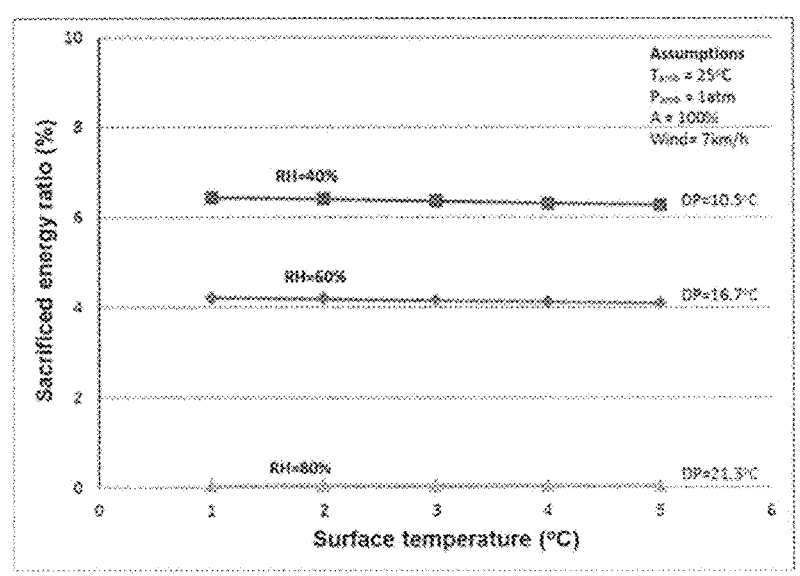

A sensitivity analysis of the sacrificed energy ratio of the solar PV system on the chilled PV-surface temperature is shown in FIG. 15, under fixed chilled PV-surface temperature conditions. Surface temperature ranges between 1 and 5° C., while the cases of 40, 60 and 80% relative humidity are presented. Ambient temperature ($T_{amb}$), ambient pressure ($P_{amb}$), wind speed, and water volume are 25° C., 1 atm, 7 km/h and 120 ml respectively. The dew point in each case is also mentioned. As illustrated in FIG. 15, the effect of the fixed PV-surface temperature on the cleaning system energy consumption is not that significant.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferable," "typical," and "suitable" when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of operating a solar system comprising a light receiving surface, a condensation subassembly, a water collection subassembly, a cleaning subassembly, one or more ambient sensors, a compressed air supply, and a process controller, wherein the method comprises:
   receiving light at the light receiving surface of the solar system, the light receiving surface exposed to ambient air;
   the condensation subassembly comprises an expansion chamber that is thermally coupled to the light receiving surface and thermally insulated from the ambient air;
   controlling a compressed air expansion valve to release compressed air from the compressed air supply into the expansion chamber of the condensation subassembly wherein compressed air pressure of the compressed air supply differs from ambient pressure and the compressed air expands in the expansion chamber to thermally cool at least a portion of the light receiving surface below a dew point temperature of the ambient air to condense water from humidity in the ambient air on the light receiving surface by indirectly thermally cooling the light receiving surface via the thermal coupling of the light receiving surface and the expansion chamber of the condensation subassembly;

collecting the water from the light receiving surface into a water collection vessel of the water collection subassembly via water direction hardware positioned to direct the condensed water on the light receiving surface to the water collection vessel;

dispensing the collected water from the water collection vessel via a cleaning fluid duct of the cleaning subassembly over the light receiving surface via a water dispensing unit of the cleaning subassembly; and controlling the release of the compressed air from the compressed air supply through the compressed air expansion valve as a function of at least one of a temperature condition, a humidity condition, and a wind speed condition of the ambient air based on an output of the one or more ambient sensors.

2. The method of claim 1 wherein the light receiving surface comprises a reflective face of a solar reflector module and the expansion chamber of the condensation subassembly is thermally coupled to a backside of the solar reflector module.

3. The method of claim 1 wherein the light receiving surface comprises an input face of a photovoltaic module and the expansion chamber of the condensation subassembly is thermally coupled to a backside of the photovoltaic module.

4. The method of claim 3 wherein:
the compressed air supply is coupled to the compressed air expansion valve of the condensation subassembly; and
the photovoltaic module is configured to dedicate a portion of its photovoltaic output to the compressed air supply.

5. The method of claim 4 wherein the solar system further comprises a supplemental power receptacle configured to permit system operation under supplemental power when the photovoltaic output of the photovoltaic module falls below a minimum operational threshold.

6. The method of claim 1 wherein the light receiving surface comprises a transparent hydrophobic coating.

7. The method of claim 1 wherein the light receiving surface comprises an input face of a photovoltaic module and the method further comprises:
measuring a photovoltaic system performance of the photovoltaic module using a photovoltaic module power monitor;
comparing the photovoltaic system performance level to a hypothetical expected-maximum photovoltaic system performance level to determine a system performance degradation; and
dispensing water over the light receiving surface using the cleaning subassembly with regard to minimizing the system performance degradation.

8. The method of claim 1 wherein the solar system comprises a plurality of light receiving surfaces arranged to define an array of solar units, each associated with a condensation subassembly, a water collection subassembly, and a cleaning subassembly.

9. The method of claim 1 wherein:
the solar system comprises a plurality of light receiving surfaces arranged to define an array of solar units, each associated with a condensation subassembly, a water collection subassembly, and a cleaning subassembly; and the compressed air supply comprises a central compressed air supply or a plurality of dedicated compressed air supplies in communication with individual solar units of the array of solar units.

10. The method of claim 1 wherein:
the compressed air supply comprises a water trap positioned to dehumidify compressed air from the compressed air supply before the compressed air enters the expansion chamber of the condensation subassembly;
the water trap is placed in fluid communication with the water collection vessel of the water collection subassembly via a supplemental water collection valve; and
the water trap prevents water entrainment on the interior surfaces of the condensation subassembly.

11. The method of claim 10 wherein:
the water trap comprises cooling fins to condense humidity in the compressed air to prevent water entrainment on the interior surfaces of the condensation subassembly.

12. The method of claim 1 wherein:
the light receiving surface comprises an input face of a photovoltaic or solar reflector module; and
one side of the expansion chamber of the condensation subassembly is thermally coupled to a backside of the module via a thermal conductivity material.

13. The method of claim 12 wherein an opposite side of the expansion chamber of the condensation subassembly comprises a layer of thermally insulating material.

14. The method of claim 1 wherein the water collection subassembly comprises a water collection filter positioned to remove particulates from the condensed water before it is directed to the water collection vessel.

15. The method of claim 1 wherein the water dispensing unit of the cleaning subassembly terminates in one or more water spray nozzles directed at the light receiving surface and comprises one or more cleaning accessories.

16. The method of claim 15 wherein the cleaning subassembly comprises a water diversion valve positioned to selectively divert wastewater generated by the activation of the cleaning subassembly from, or direct filtered wastewater to, the water collection vessel.

17. The method of claim 1 wherein the process controller activates the water dispensing unit of the cleaning subassembly for cleaning the light receiving surface prior to activation of the water collection subassembly for humidity condensation and water collection on the light receiving surface.

18. The method of claim 1 wherein the solar system comprises an ambient temperature sensor, an ambient humidity sensor, or a combination thereof, wherein the process controller activates the water collection subassembly as a function of ambient temperature, humidity, or a combination thereof.

19. The method of claim 1 wherein:
the light receiving surface comprises an input face of a photovoltaic module;
the solar system comprises a photovoltaic module power monitor and the process controller; and
the process controller activates the cleaning subassembly as a function of power generated by the photovoltaic module, as sensed by the power monitor.

20. The method of claim 1 wherein:
the solar system comprises the compressed air supply and the process controller;

the compressed air supply is coupled to the compressed air expansion valve of the condensation subassembly; and the process controller activates the cleaning subassembly as a function of air pressure in the compressed air supply.

21. The method of claim 1 wherein:

the solar system comprises the one or more ambient sensors, the compressed air supply, and the process controller;

the compressed air supply is coupled to the compressed air expansion valve of the condensation subassembly; and the process controller controls the release of compressed air from the compressed air supply through the compressed air expansion valve by measuring activation conditions that comprise release duration, pressure drop, or a combination thereof, such that a negative air pressure gradient is formed across the expansion valve that is sufficient to lower the air temperature inside the expansion chamber and the surface temperature of the light receiving surface below the dew point temperature of the ambient air causing condensation to form on the light receiving surface.

22. The method of claim 1 further comprising operating the solar system by controlling activation conditions of the water collection subassembly as a function of air pressure in the compressed air supply and ambient sensor output and by the steps of controlling the release of compressed air from the compressed air supply through the compressed air expansion valve, wherein compressed air is not released from the compressed air supply until the water dispensing unit of the cleaning subassembly has cleaned the light receiving surface and the air pressure of the compressed air supply is sufficient to activate the condensation subassembly.

23. The method of claim 1 further comprising:

determining an optimal frequency, duration, or time-of-day for activation of the cleaning and collection subassemblies with regard to maximizing photovoltaic output of the light receiving surface, wherein the light receiving surface comprises an input face of a photovoltaic module; and operating the cleaning and collection subassemblies with regard to maximizing the photovoltaic output of the light receiving surface.

* * * * *